Dec. 31, 1968  R. S. BONNEY  3,419,847
LOW BRIDGE WARNING DEVICE FOR VEHICLES
Filed Jan. 28, 1966
FIG. 1
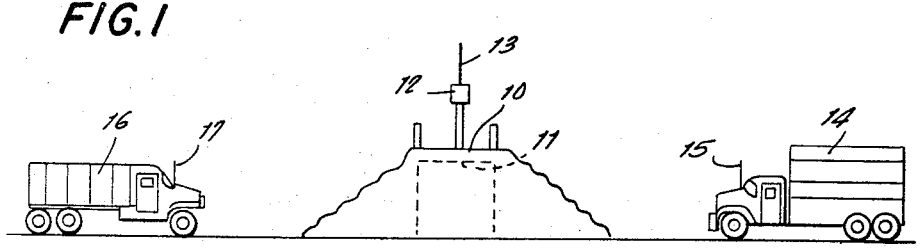
FIG. 2
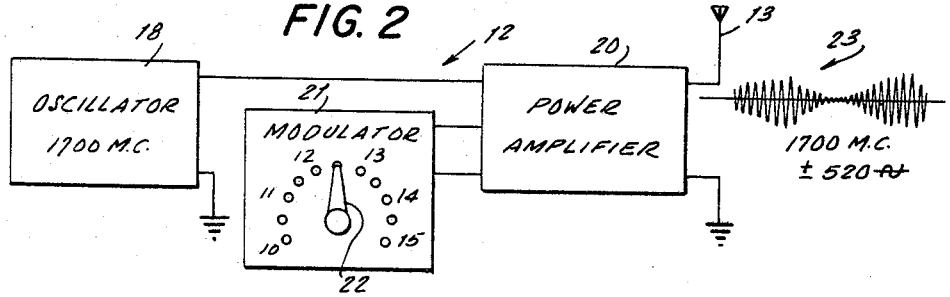
FIG. 3
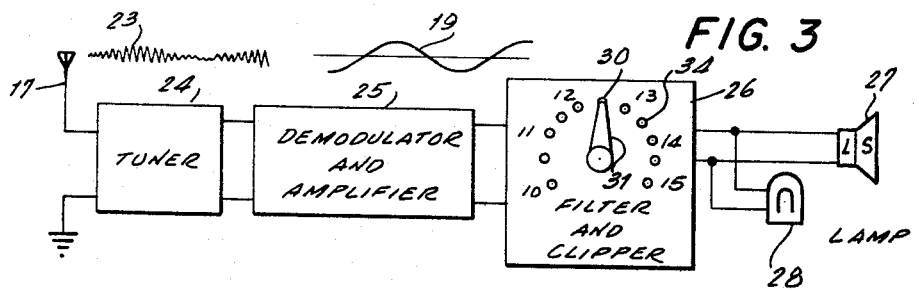
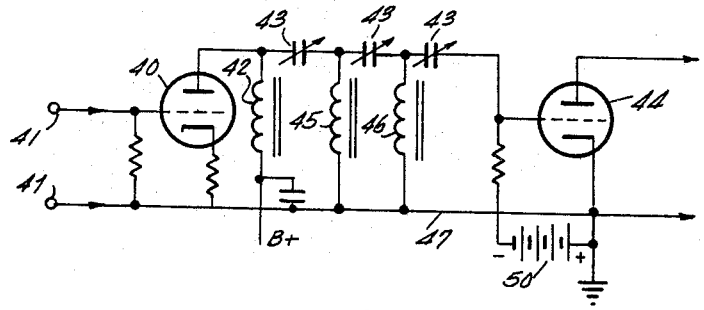
FIG. 4
FIG. 5
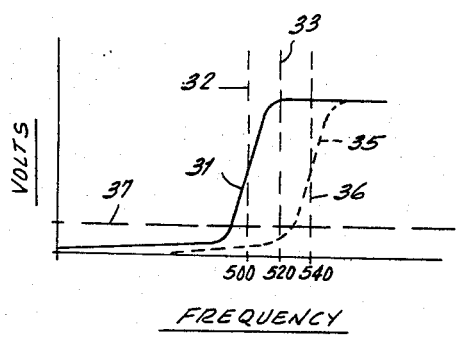
INVENTOR.
ROBERT S. BONNEY
BY Albert F. Kooiman
ATTORNEY

United States Patent Office 3,419,847
Patented Dec. 31, 1968

3,419,847
LOW BRIDGE WARNING DEVICE
FOR VEHICLES
Robert S. Bonney, 518 Wildwood Road,
West Allenhurst, N.J. 07711
Filed Jan. 28, 1966, Ser. No. 523,667
10 Claims. (Cl. 340—22)

This invention relates to a radio system which informs a mobile unit such as a car or a truck whether or not the unit has clearance to pass under an obstruction such as a bridge. The invention has particular reference to the circuits employed in the system and the adjustments which can be made in the circuit to change the indicators to accommodate various heights of bridges or the height of the truck is varied.

It is very important to the driver of a truck to know whether or not the vehicle he is driving can pass under a bridge or other obstruction. This is particularly important when the truck driver is traveling along a new road or at any place where an unknown obstruction exists. It is also important to have this information in advance so that, if the bridge is too low, the driver may turn off and take another route or else change the height of the load the truck is carrying.

An object of the present invention is to provide an improved height clearance indicator which avoids one or more of the disadvantages and limitations of prior art arrangements.

Another object of the present invention is to inform a truck driver in advance whether or not the vehicle he is driving can pass under a bridge.

A further object of the present invention is to maintain a transmitting device on or near a bridge structure which can be used by all vehicles equipped with the corresponding receiving devices.

A still further object of the present invention is to increase the safety of travel on highways.

Another object of the present invention is to furnish information regarding height clearance regardless of the slope of the road, turns in the road, or the weather.

The invention consists of the construction, combination and arrangement of parts as herein illustrated, described and claimed.

In the accompanying drawing, forming a part hereof, there is illustrated one form of embodiment of the invention, in which drawings similar reference characters designate corresponding parts, and in which:

FIGURE 1 is a side view of a bridge and two trucks, illustrating one form of the invention and showing the location of the transmitting and receiving device.

FIGURE 2 is a circuit diagram of one form of the transmitter which includes an oscillator, an adjustable modulator, a power amplifier, and an antenna.

FIGURE 3 is a circuit diagram of the receiver and includes the usual tuner, demodulator, adjustable filter, and a loud speaker.

FIGURE 4 is a circuit diagram showing the details of an adjustable filter connected between two triodes, one of which is over biased to produce a clipping action.

FIGURE 5 is a graph showing how the filter permits some sounds to be passed to the loud speaker while other sounds are eliminated.

Referring now to FIGURE 1, a bridge 10 is shown having an underpass 11 through which vehicles may pass if they are not too high. On top of the bridge, a transmitter 12 is erected having an antenna 13. A large truck 14 is shown at one side of the bridge which is too high to pass under the bridge. This truck has a receiving circuit (not shown) and an antenna 15 which is positioned so as to receive signals from the transmitting antenna 13. The receiving antenna and its associated circuits are arranged so that a local filter circuit is adjusted to vary its cut-off frequently to represent the height of the truck body. On the other side of the bridge another truck 16 is indicated having a height which will permit it to pass under the bridge. This truck also has an antenna 17 and a receiving circuit (not shown) in the truck body with a similar filtering circuit adjusted to represent the height of the truck.

Referring now to FIGURE 2, the transmitting set 12 includes an oscillator 18 which is controlled to oscillate at a predetermined frequency, this frequency being the same for all bridge transmitting circuits employing this system. The oscillator 18 is connected to a power amplifier 20 which in turn is coupled to the antenna 13. The power amplifier 20 is amplitude modulated by a modulator circuit 21. The modulator circuit contains an adjustable oscillator which can be set to produce a series of modulating frequencies, each one of which is representative of the height of the underpass. In the circuit shown, an adjustable arm 22 is set at a contact point 13 indicating that the underpass height is 13 feet. As shown in FIGURE 2, this adjustment has a range which includes 10 to 15 feet with adjustable increments of half-feet. The modulating frequency may be any number of times the height indicated. In this case the height 13 feet is multiplied by 40 to produce a modulating frequency of 520 cycles per second. The other height settings produce similar adjusted frequencies. Oscillating circuits are well known in the art as are modulator circuits and the details of such circuits are not shown. The result of the modulation is a wave 23 which includes the base frequency of 1700 megacycles plus the side band frequencies of 520 cycles above and below the carrier wave.

FIGURE 3 shows the receiver circuit which includes the antenna 17, the usual tuner 24, a demodulator and amplifier 25, and an adjustable filter and clipper circuit 26. A loudspeaker 27 is connected to the filter circuit and a visual signal such as a lamp may also be connected to the output of the filter circuit. The tuner circuit 24 and the demodulator and amplifier circuit 25 are the usual circuit components which may be found in any radio receiving set. The demodulator circuit produces a wave 19 of 520 cycles. The adjustable filter and clipper circuit 26 is shown in detail in FIGURE 4. It is assumed that this receiving circuit is mounted on truck 16 and that this truck has a body height of 12½ feet. The truck operator must set the filter circuit 26 on a point 30 by moving arm 31 prior to the approach to the bridge. This setting adjusts certain components within the filter circuit so that only certain frequencies can be passed to the loudspeaker. As noted above, this cut-off frequency is 40 times the height of the truck body. Since the setting is 12½ feet, the filter cut-off frequency is 500 cycles per second. All frequencies above 500 cycles are transmitted to the loudspeaker and lamp. All frequencies below 500 cycles per second are eliminated.

With an underpass height of 13 feet and a transmitted wave modulated at 500 cycles, the receiver filter is set at 20 cycles less than the modulation wave. This means that substantially all of the demodulated signal is sent to the loudspeaker 27 which will then produce a loud sound and tell the truck operator that his truck can move through the underpass. This condition is shown in FIGURE 5 where a characteristic curve 31 indicates the action of the receiving filter 26. The cut-off frequency line 32 indicates that about half of the applied voltage of 500 cycles will pass through the filter. FIGURE 5 also indicates that when the filter is set at 520 cycles, denoted by line 33, the entire signal is passed to the loudspeaker.

Now let it be assumed that truck 14, having an antenna 15 and a similar receiving set approaches the underpass 11. Let it be assumed also that the height of this truck is 13½ feet, a height that cannot pass through the underpass. This truck will have its filter arm set on point 34 representing 13½ feet and this setting will adjust the filter so that its characteristic curve is shown by dotted line 35 having a cut-off frequency denoted by dotted line 36. It is obvious from the graph that a small percentage of sound will be produced at this setting because the high-pass filter 26 does not cut off all frequencies below the cut-off frequency. Because of this, a clipper circuit is added to the filter to eliminate all sounds below a certain volume, this volume being represented in FIGURE 5 by the dashed line 37. With the receiver filter set on point 34 and arranged for a cut-off frequency of 540 cycles per second and with the transmitting set 12 transmitting a wave modulated at 520 cycles per second, no sound will be heard by the truck operator as he approaches the bridge. This lack of signal indicates that the truck must make a detour or lower the truck body height.

FIGURE 4 shows the details of one form of a high-pass filter which can be employed between two triode amplifier stages. A first triode 40 has its grid and cathode coupled to terminals 41 which receive the signal directly from the demodulator 25 or from another stage of amplification. The anode or triode 40 is connected to an inductance 42 which provides a means for supplying the anode with current from an anode source of potential. Three adjustable capacitors 43 are connected in series between the anode and the control electrode of a second triode 44. Inductors 45 and 46 are connected between the junction points of the capacitors and a ground conductor 47. The output of this circuit is coupled to the anode of the second triode 44 and the ground conductor.

The three inductors 42, 45, 46, and the three adjustable capacitors 43 form a high-pass filter, the cut-off frequency of which may be shifted by varying the three capacitors in synchronism. If a greater range of cut-off frequencies is desired, the three inductors can also be made variable. Arm 31 can be connected to a common shaft which varies all three capacitors as the indicator is adjusted.

The above described arrangement of producing a positive signal whenever the truck can pass through the underpass of a bridge is the preferred embodiment because then the operator will know without question that the way is clear. However, a low-pass filter may be used and a signal produced only when there is an obstruction. Both methods of operation are permissible with the equipment as shown and described.

In order to cut off all unwanted noise and a small percentage of the signal which always leaks through the filter and other circuits, triode 44 is biased by a control battery 50 to a value which is somewhat more than the anode current cut-off potential. This means that when there is no signal passing through the circuit there will be no anode current flowing through triode 44. Triode 44 produces a signal only when the voltage applied to its control electrode is greater than the back bias potential which is represented by line 37 in FIGURE 5.

Having thus fully described the invention, what is claimed as new and desired to be secured by Letters Patent of the United States, is:

1. A height clearance indicator system comprising, a transmitting device positioned adjacent to an obstruction to limit the height of a vehicle about to pass under it, said transmitting device including an oscillator for generating a predetermined radio carrier frequency, a modulator for modulating the carrier frequency at a modulation frequency related to the height of the obstruction, and an antenna for radiating the modulated wave, a receiving circuit mounted on each vehicle which may attempt to pass under said obstruction, said receiving circuit including an antenna, a tuning circuit adjusted to receive said carrier frequency, a demodulator for rectifying the receiver wave to produce the modulating frequency, a high-pass electrical filter adjusted for passing only those frequencies which are above a frequency related to the height of the vehicle, and a signal device connected to the filter for producing a signal when the vehicle has clearance for passing under the obstruction.

2. An indicator system as claimed in claim 1, wherein said modulator changes the amplitude of the carrier wave at the modulation frequency.

3. An indicator system as claimed in claim 1 wherein said modulator changes the frequency of the carrier wave at the modulation frequency.

4. An indicator system as claimed in claim 1 wherein said modulation frequency is adjusted by means of a first manually positioned indicator coupled to an oscillator in the modulation circuit, said indicator having indicia denoting the obstruction height.

5. An indicator system as claimed in claim 1 wherein said high-pass filter is composed of a plurality of filter sections, each section including a series capacitor and a shunt inductor.

6. An indicator system as claimed in claim 5 wherein the capacity of said capacitor is adjusted by means of a second manually positioned indicator coupled to said capacitors, said second indicator having indicia denoting the height of the truck body.

7. An indicator system as claimed in claim 1 wherein said signal device is a loudspeaker.

8. An indicator system as claimed in claim 1 wherein said signal device is a lamp.

9. An indicator system as claimed in claim 1 wherein said receiving circuit includes a clipper circuit which eliminates all frequencies having a voltage less than a predetermined value.

10. An indicator system as claimed in claim 1 wherein said high-pass filter is replaced by a low-pass filter having the same cut-off frequency, said signal device thereby producing a signal when the vehicle does not have clearance for passing under the obstruction.

No references cited.

JOHN W. CALDWELL, *Primary Examiner.*

ALVIN H. WARING, *Assistant Examiner.*

U.S. Cl. X.R.

340—61, 258; 325—29